United States Patent
Chu et al.

(10) Patent No.: US 6,522,462 B2
(45) Date of Patent: Feb. 18, 2003

(54) ALL OPTICAL LOGIC USING CROSS-PHASE MODULATION AMPLIFIERS AND MACH-ZEHNDER INTERFEROMETERS WITH PHASE-SHIFT DEVICES

(75) Inventors: Tzu-Yih Chu, San Jose, CA (US); Shyang Chang, Hacienda, CA (US); Chi Au, Union City, CA (US); Abraham C. Ma, Fremont, CA (US)

(73) Assignee: Super Light Wave Corp., San Jose, CA (US)

( * ) Notice: Subject to any disclaimer, the term of this patent is extended or adjusted under 35 U.S.C. 154(b) by 9 days.

(21) Appl. No.: 09/682,283

(22) Filed: Aug. 14, 2001

(65) Prior Publication Data

US 2003/0002797 A1 Jan. 2, 2003

Related U.S. Application Data

(63) Continuation-in-part of application No. 09/681,964, filed on Jun. 29, 2001, now Pat. No. 6,462,865.

(51) Int. Cl.$^7$ .................................................. H01S 3/00
(52) U.S. Cl. ...................................... 359/344; 359/109
(58) Field of Search ................................. 357/344, 108

(56) References Cited

U.S. PATENT DOCUMENTS

| | | | |
|---|---|---|---|
| 4,262,992 A | 4/1981 | Berthold, III | 350/96.14 |
| 5,004,314 A | 4/1991 | Booth et al. | 350/96.14 |
| 5,315,422 A | 5/1994 | Utaka et al. | 359/107 |
| 5,367,586 A | 11/1994 | Glance et al. | 385/24 |
| 5,537,243 A | 7/1996 | Fatehi et al. | 359/541 |
| 5,703,975 A | 12/1997 | Miller et al. | 385/16 |
| 5,751,758 A | 5/1998 | Kuwatsuka | 372/96 |
| 5,754,714 A | 5/1998 | Suzuki et al. | 385/5 |
| 5,798,853 A | 8/1998 | Watanabe | 359/160 |
| 5,815,610 A | 9/1998 | Tokano et al. | 385/2 |
| 5,825,517 A | 10/1998 | Antoniades et al. | 359/117 |
| 5,878,181 A | 3/1999 | Van Der Tol | 385/122 |
| 5,970,185 A | 10/1999 | Baker et al. | 385/3 |
| 5,999,283 A | 12/1999 | Roberts et al. | 359/108 |
| 5,999,284 A | 12/1999 | Roberts | 359/108 |
| 6,035,079 A | 3/2000 | Fields et al. | 385/19 |
| 6,069,732 A * | 5/2000 | Koch et al. | 359/344 |
| 6,169,824 B1 | 1/2001 | Sigogne et al. | 385/3 |
| 6,377,388 B1 * | 4/2002 | Sakata et al. | 359/321 |
| 6,462,865 B1 * | 10/2002 | Chu et al. | 359/344 |

FOREIGN PATENT DOCUMENTS

EP  0 898 348 A1 * 2/1999

OTHER PUBLICATIONS

Stubkjaer, "Semiconductor Optical Amplifier–Based All–Optical Gates for High–Speed Optical Processing" (2000), IEEE Journal on Selected Topics in Quantum Electronics, vol. 6, No. 6, pp. 1428–1435.*

Leuthold, et al., "All–Optical Space Switches with Gain and Principally Ideal Extinction Ratios", IEEE J. Quant Elect. vol. 34, No. 4, 4/98. pp. 622–633.

(List continued on next page.)

*Primary Examiner*—Mark Hellner
(74) *Attorney, Agent, or Firm*—Stuart T. Auvinen

(57) ABSTRACT

Optical logic gates are constructed from Mach-Zehnder Interferometer (MZI) optical circuits. A multi-mode interference (MMI) splitter divides a continuous-wave input into two branches of the interferometer. Each branch has a semiconductor optical amplifier (SOA). When a logic input having a logic-high power level is applied to one of the SOA's, cross-phase modulation occurs in the SOA. The phase shift increases through the SOA. The branch coupled to the logic input has a relative phase shift of $\pi$ compared with the other branch. When two branches with the $\pi$ phase difference are combined, destructive interference occurs, producing a logic low. An MMI combiner or an equivalent phase shifter is used to combine the two branches. The MMI splitter adds a phase shift of $\pi/2$ to the upper branch but not to the lower branch, while the MMI combiner also adds $\pi/2$ shifts.

23 Claims, 11 Drawing Sheets

OTHER PUBLICATIONS

Shin, et al., "An Integrated Hybrid Device for Binary-Phase-Shift-Keying Subcarrier Modulation", IEEE Photonics Tech Ltr. vol. 12, No. 5, 5/00, pp. 516–518.

Pan, et al., "Dynamic Operation of a Three-Port, Integrated mach-Zender Wavelenght Converter", IEEE Photonics Tech Ltrs. vol. 7, No. 9, 9/95, pp. 995–997.

Soldano & Pennings, "Optical Multi-Mode Interference Devices Based on Self-Imaging: Principles and Applications", IEEE J. Lightwave Tech, vol. 13, No. 4, 4/95 pp. 615–627.

Lee, et al., "Theoretical Study of Frequency Chirping and Extinction Ratio of Wavelength-Converted Optical Signals by XGM and XPM Using SOA's", IEEE J. Quant Elect. vol. 35, No. 8, 8/99, pp. 1213–1219.

Leuthold et al. "Multimode Interference Couplers for the Conversion and Combining of Zero-and First-Order Modes", IEEE J. Lightwave Tech, vol. 16, No. 74,7/98 pp. 1228–1239.

Nesset et al., "All-Optical Wavelength Conversion Using SOA Nonlinearities", IEEE Communications Mag, 12/98, pp. 56–61.

Kloch et al. "Wavelength Converters", IEEE Trans. Electron, vol. E82–C, No. 8, 8/99, pp. 1475–1486.

* cited by examiner

PRIOR ART
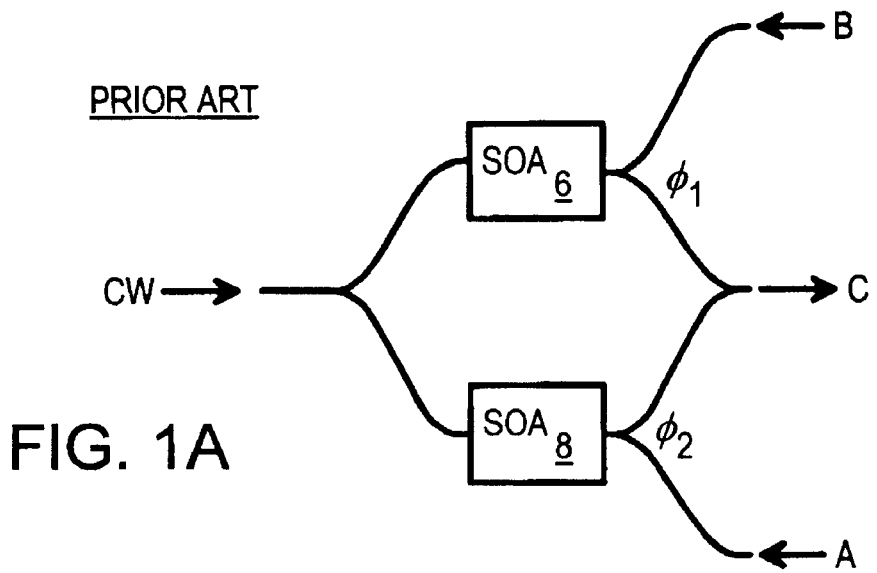
FIG. 1A
| A | B | C |
|---|---|---|
| 0 | 0 | 1 |
| 0 | 1 | 0 |
| 1 | 0 | 0 |
| 1 | 1 | 1 |
FIG. 1B
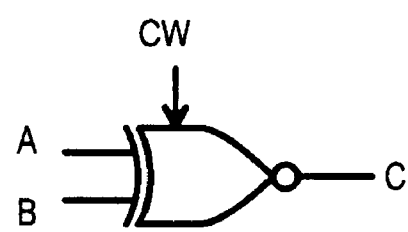
FIG. 1C

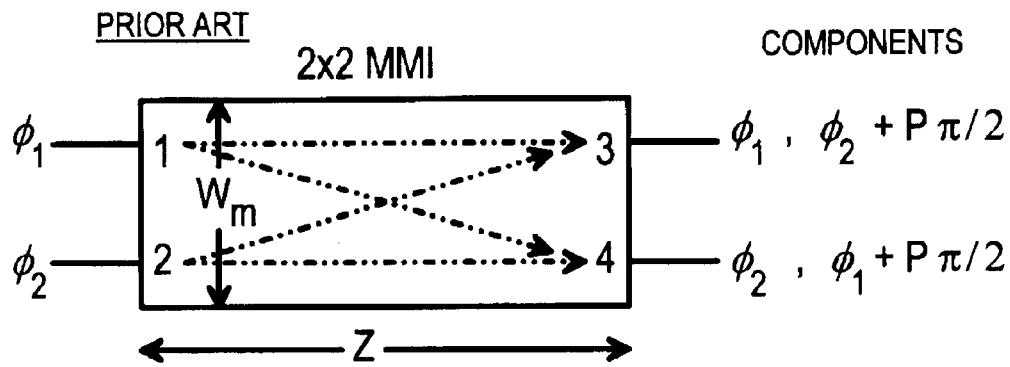

FIG. 2A $$Z = \frac{P}{2}(3L_\pi) \qquad P = 1, 3, 5, ...$$

| INPUTS 1,2 | | OUTPUT 3 | | | OUTPUT 4 | | |
|---|---|---|---|---|---|---|---|
| $\phi_1$ | $\phi_2$ | COMPNTS | PHASE DIFF. | LOGIC 1/0 | COMPNTS | PHASE DIFF. | LOGIC 1/0 |
| 0 | $\pi/2$ | $(0, \pi)$ | $\pi$ | 0 | $(\pi/2, \pi/2)$ | 0 | 1 |
| 0 | $3\pi/2$ | $(0, 2\pi)$ | $2\pi$ | 1 | $(3\pi/2, \pi/2)$ | $\pi$ | 0 |
| $\pi/2$ | 0 | $(\pi/2, \pi/2)$ | 0 | 1 | $(0, \pi)$ | $\pi$ | 0 |
| $3\pi/2$ | 0 | $(3\pi/2, \pi/2)$ | $\pi$ | 0 | $(0, 2\pi)$ | $2\pi$ | 1 |
| $\pi/2$ | $\pi$ | $(\pi/2, 3\pi/2)$ | $\pi$ | 0 | $(\pi, \pi)$ | 0 | 1 |
| $3\pi/2$ | $\pi$ | $(3\pi/2, 3\pi/2)$ | 0 | 1 | $(\pi, 2\pi)$ | $\pi$ | 0 |
| $\pi$ | $\pi/2$ | $(\pi, \pi)$ | 0 | 1 | $(\pi/2, 3\pi/2)$ | $\pi$ | 0 |

FIG. 2B

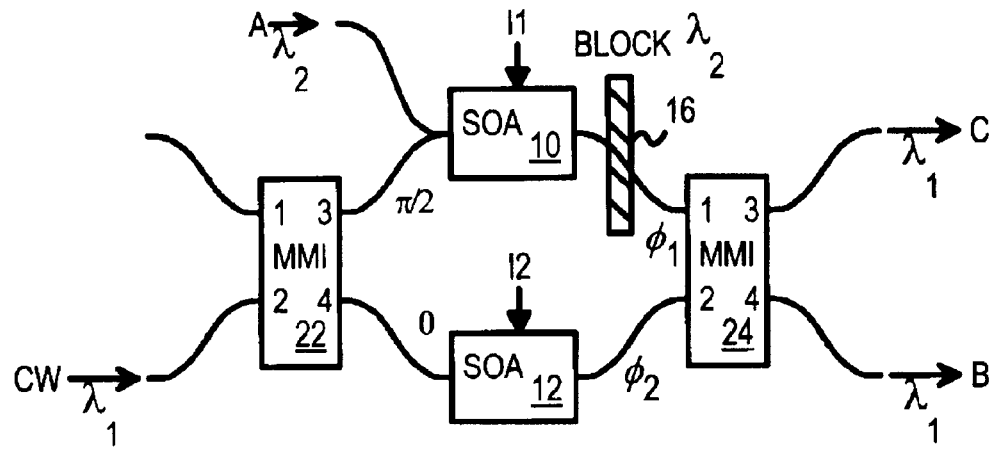
FIG. 3A
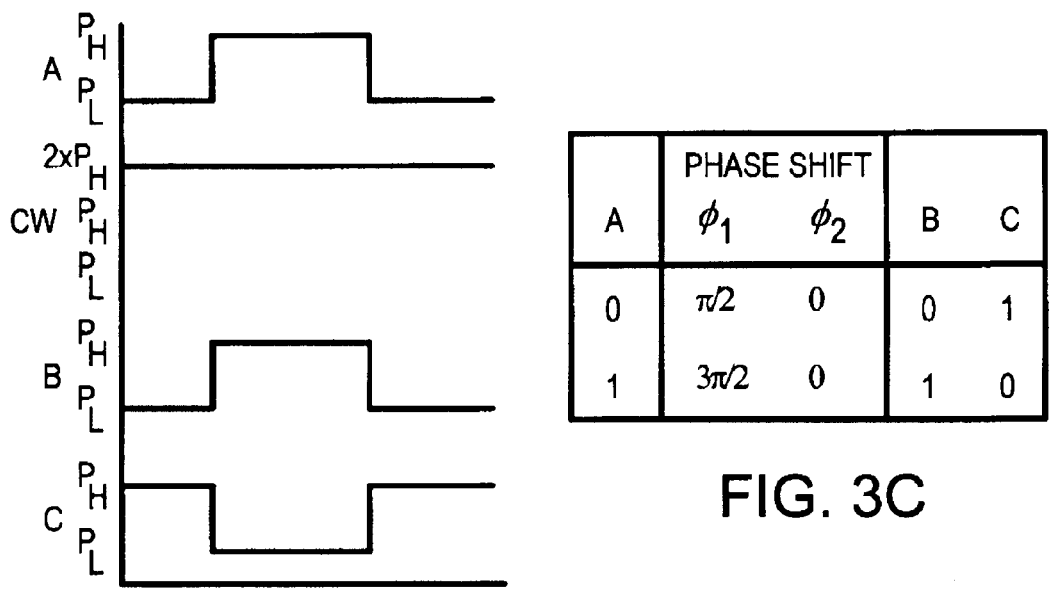
FIG. 3B
FIG. 3C
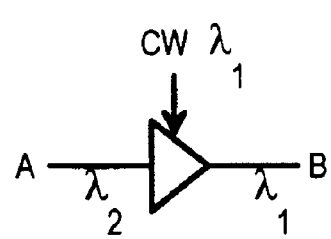 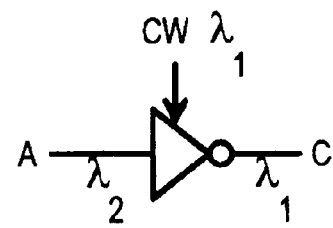
FIG. 3D

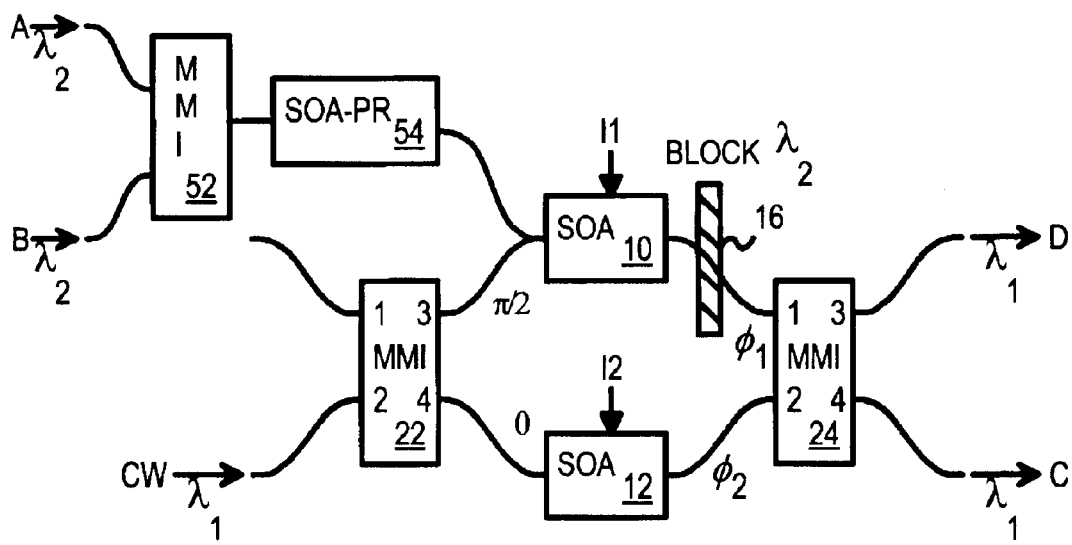
FIG. 4A
| A | B | PHASE SHIFT $\phi_1$ | $\phi_2$ | C | D |
|---|---|---|---|---|---|
| 0 | 0 | $\pi/2$ | 0 | 0 | 1 |
| 0 | 1 | $3\pi/2$ | 0 | 1 | 0 |
| 1 | 0 | $3\pi/2$ | 0 | 1 | 0 |
| 1 | 1 | $3\pi/2$ | 0 | 1 | 0 |
FIG. 4B
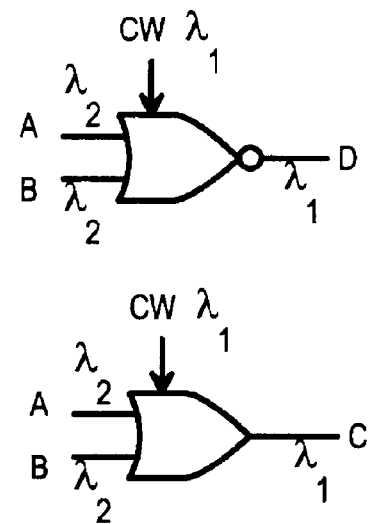
FIG. 4C

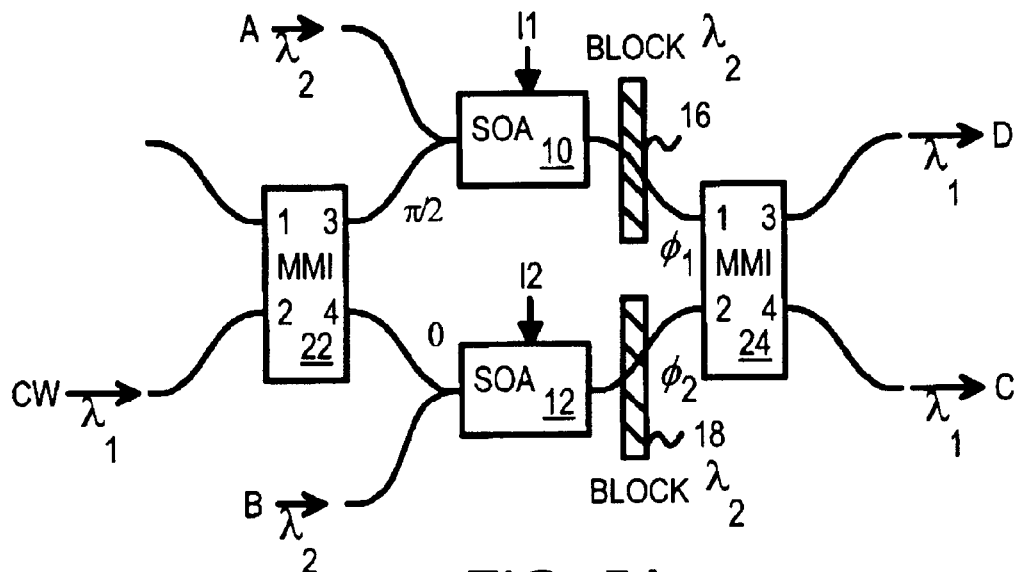
FIG. 5A
| A | B | PHASE SHIFT $\phi_1$ | $\phi_2$ | C | D |
|---|---|---|---|---|---|
| 0 | 0 | π/2 | 0 | 0 | 1 |
| 0 | 1 | π/2 | π | 1 | 0 |
| 1 | 0 | 3π/2 | 0 | 1 | 0 |
| 1 | 1 | 3π/2 | π | 0 | 1 |
FIG. 5B
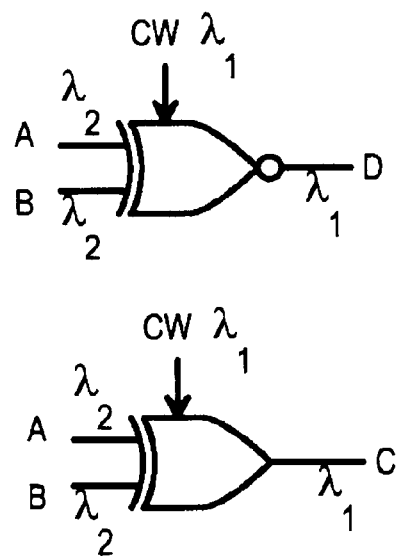
FIG. 5C

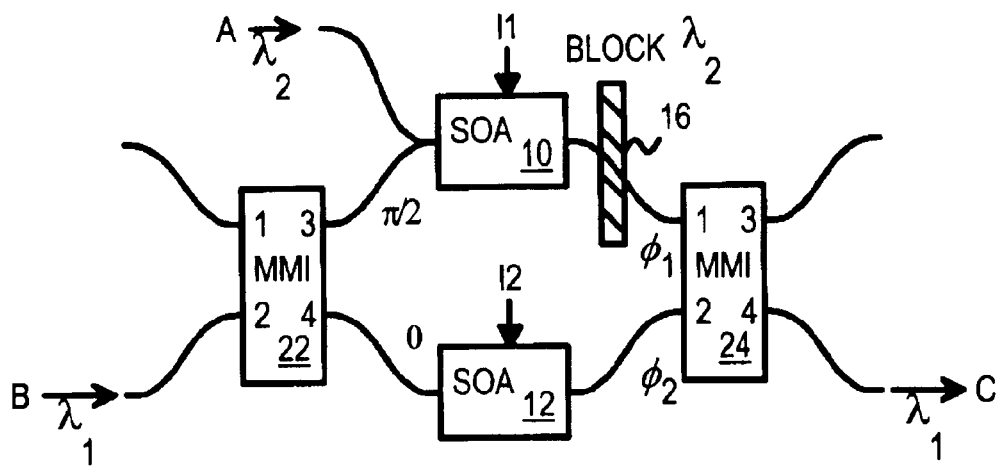
FIG. 6A
| A | B | PHASE SHIFT $\phi_1$ | $\phi_2$ | C |
|---|---|---|---|---|
| 0 | 0 | 0 | 0 | 0 |
| 0 | 1 | $\pi/2$ | 0 | 0 |
| 1 | 0 | 0 | 0 | 0 |
| 1 | 1 | $3\pi/2$ | 0 | 1 |
FIG. 6B
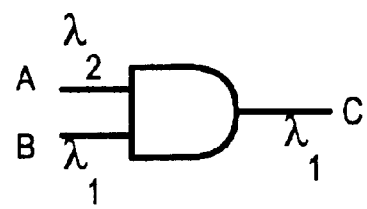
FIG. 6C

ALL OPTICAL LOGIC USING CROSS-PHASE MODULATION AMPLIFIERS AND MACH-ZEHNDER INTERFEROMETERS WITH PHASE-SHIFT DEVICES

CROSS REFERENCE TO RELATED APPLICATIONS

This application is a continuation-in-part of the application for All Optical Logic With Wired-OR Multi-Mode-Interference Combiners and Semiconductor-Optical-Amplifier Inverters, U.S. Ser. No. 09/681,964, filed Jun. 29, 2001 now U.S. Pat. No. 6,462,865.

BACKGROUND OF INVENTION

This invention relates to all-optical logic elements, and more particularly to the use of interferometers with semiconductor optical amplifiers (SOA) and multi-mode interference (MMI) devices.

Since photons travel faster than electrons, much effort has gone into trying to develop an optical computer or optical logic elements. Different approaches have been taken to developing optical logic and other elements of a computer. Most of these approaches have proven to be difficult to produce, expensive, or bulky.

Optical logic gates are using an interferometer are disclosed by Roberts et al. in U.S. Pat. No. 5,999,283. FIG. 1A is a prior-art interferometer-based exclusive-OR (XOR) gate. A continuous-wave light input is split into two branches to semiconductor optical amplifiers (SOA) 6, 8. Modulated input A is combined with the output of SOA 8, while modulated input B is combined with the output of SOA 6. Outputs of SOA 6, 8 are combined to produce the logic-gate output C.

The logical input signal A combines with the output of SOA 8, either constructively or destructively, depending on the phase difference. Likewise, constructive or destructive interference occurs where input B is combined with the output of SOA 6. Finally, constructive or destructive interference occurs where the two interferometer arms are combined to generate the final output C.

SOA 6, 8 have the same phase shift when A and B are at logic 0. The output C is a logical XNOR of A and B. SOA differ in phase shift when A and B are at logic 0 by π, and output C is the logical XOR of A and B. FIG. 1B shows the XOR function when the SOA's have a zero phase difference. FIG. 1C shows that the interferometer gate is an XNOR gate with a third continuous-wave input.

While useful, the counter-propagation of the logical inputs can feed back to the continuous-wave input, which may cause cross-talk among other gates that share the same continuous-wave signal source. Splitting of the continuous-wave signal power may not be the ideal 50%–50% due to geometry or orientation imperfections of the Y-junctions.

The parent application disclosed optical logic gates using semiconductor optical amplifiers (SOAs) configured in a cross-gain modulation (XGM) mode. The parent application uses and multi-mode interference (MMI) splitters/combiners to better control optical power. The inventors realize that phase modulation may be used in place of gain modulation for the optical logic gates.

Optical logic gates are desired that employ phase modulation and interferometric techniques with multi-mode interference (MMI) devices for better optical power distribution and control.

BRIEF DESCRIPTION OF DRAWINGS

FIGS. 1A–C show a prior-art interferometer-based exclusive-OR (XOR) gate.

FIG. 2A shows a multi-mode interference (MMI) device.

FIG. 2B is a table showing the outputs of the 2×2 MMI as a function of various phase differences among the inputs.

FIGS. 3A–D show an optical buffer and inverter using a cross-phase modulation interferometer with SOA and MMI devices.

FIGS. 4A–C show an optical interferometer OR-NOR gate with a power-restoring SOA.

FIGS. 5A–C show an optical XOR-XNOR gate using an MMI splitter and combiner.

FIGS. 6A–C show an AND gate using an interferometer with SOA and MMI devices but without a continuous-wave input.

DETAILED DESCRIPTION

Figure 2C:
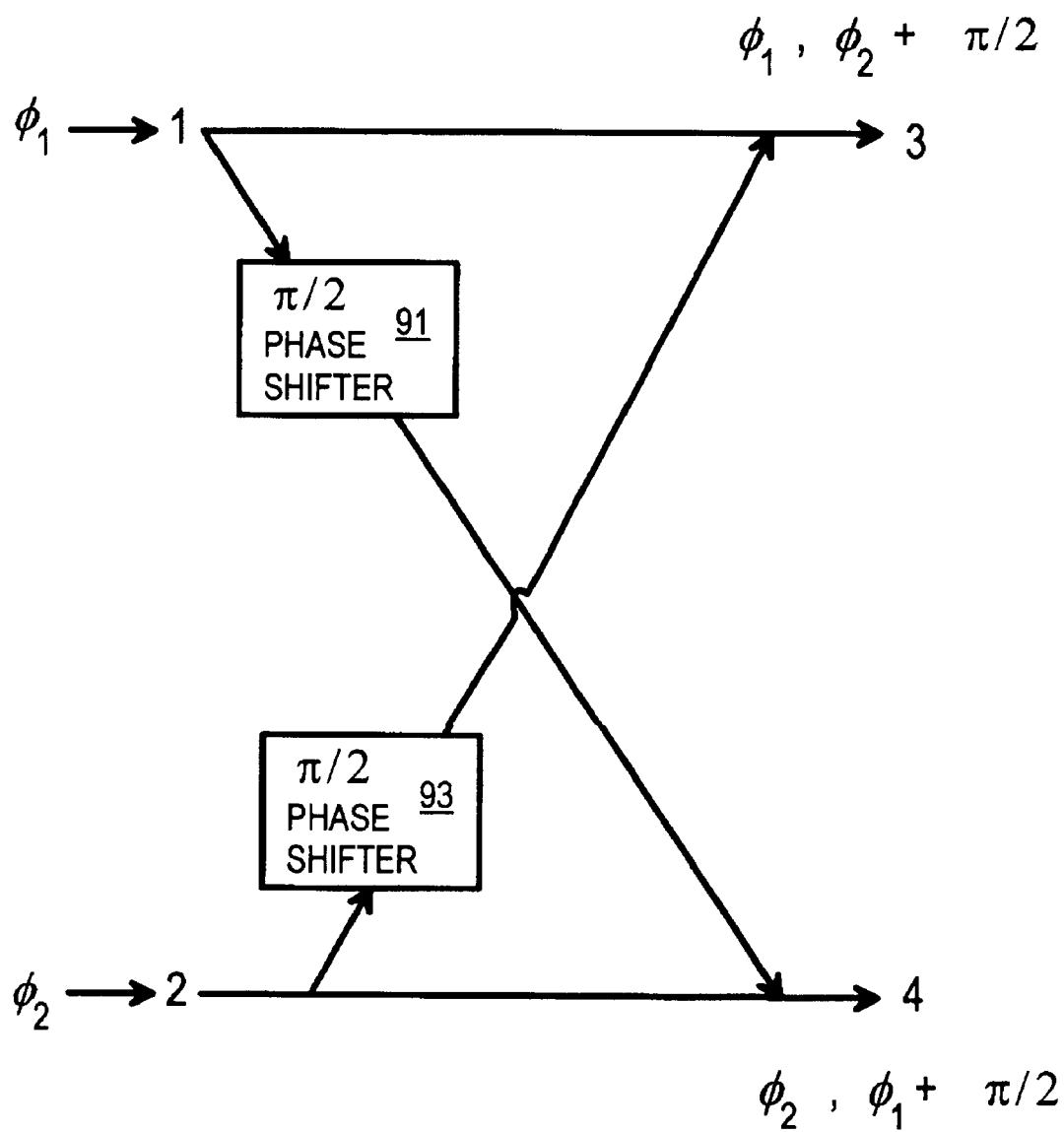
FIG. 2C shows a 2×2 MMI-equivalent optical phase control circuit.

The present invention relates to an improvement in optical logic gates. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventors recognize that arbitrary logic can be constructed from an inverter and a 2-input OR gate, or a 2-input NAND gate. Large optical computers and smaller optical logic and control units could then be feasible. An optical Y-junction can operate like a wired-OR gate in digital-electronic logic. Together, the optical-OR junction and an optical inverter allow for a wide variety of digital logic gates and functions to be implemented.

Rather than use a basic Y-junction, a multi-mode interference (MMI) device acts as a junction, combining two optical input signals to generate one or more optical output signals. MMI devices are also used as optical splitters, and to generate signals with a desired phase difference for different arms of an interferometer.

FIG. 2A shows a multi-mode interference (MMI) device. MMI devices are optical directional couplers that use the self-imaging or interferometric properties of a small optical cavity or planar waveguide to pass optical signals from an input opening to one or more output openings. Constructive and destructive interference of the two inputs occurs within the waveguide. The length Z and width $W_m$ of the waveguide relative to the input wavelength are design parameters. The locations of output openings in the waveguide can be carefully designed to be located at interference maxima. $L\pi$ is a design parameter that is a function of the waveguide refractive index, free space wavelength and waveguide geometry and is defined in prior art. See L. Soldano, et al, Optical Multi-Mode Interference Devices Based on Self-Imaging: Principle and Applications, Journal of Lightwave Technology, Vol., 13, No. 4, April 1995.

The MMI device shown is designed to have a mirror image at the outputs using multi-mode interference of the two inputs 1, 2. The two inputs produce two-fold images at the outputs. The output images have the same amplitude, but a quadrature phase difference of $\pi/2$.

An optical signal with a phase shift $\phi 1$ (phi-1) is applied to input 1, while another optical signal with phase shift $\phi 2$ is applied to input 2. The signal from input 1 passes straight through the MMI device to output 3. Thus output 3 has a $\phi 1$ signal component. Likewise, signal from input 2 passes straight through the MMI device to output 4. Thus output 4 has a $\phi 2$ signal component.

The phases $\phi 1$, $\phi 2$ are relative phases, rather than absolute phases. The MMI device has some phase shift even on the straight paths, so the input phase $\phi 1$ is somewhat less than the output phase component $\phi 1$. The same is true for the input phase $\phi 2$ and $\phi 2$ used for calculating the MMI outputs. However, the relative phases or phase difference between $\phi 1$ and $\phi 2$ at the input to the MMI device is the same phase difference as the $\phi 1$, $\phi 2$ values used to calculate the MMI outputs. Thus the term phase usually refers herein to relative phases to phase difference, not to absolute phase shifts.

The optical inputs can also pass through the MMI device diagonally with an added phase shift of $P*\pi/2$. Thus the signal from input 1 crosses over to output 4, producing a $\phi 1 + P\pi/2$ component, where P is an odd whole number. Likewise, the signal from input 2 crosses over to output 3, producing a $\phi 2 + P\pi/2$ component.

The signal components at each output can interfere with each other constructively or destructively. For example, when $\phi 1$ is out-of-phase with $\phi 2$ by 90 degrees ($\phi 2 = \phi 1 + \pi/2$), then at output 3, the two components are $\phi 1$ and ($\phi 2 + \pi/2$) = ($\phi 1 + \pi/2 + \pi/2$) = ($\phi 1 + \pi$). Since a phase difference of $\pi$ (180 degrees) exists between the two components, destructive interference occurs and output 3 is dark. Output 4 has components $\phi 2 = (\phi 1 + \pi/2)$ and $\phi 1 + \pi/2$. Since these two components have the same phase, constructive interference occurs and output 4 is bright. Analysis is simplified by using the primary mode with P=1, but similar interference occurs for higher-order phase shifts.

When inputs 1, 2 differ in phase by $3\pi/2$ ($\phi 2 = \phi 1 + 3 \pi/2$), then output 3 has components $\phi 1$ and ($\phi 2 + \pi/2) = (\phi 1 + 3\pi/2 + \pi/2) = (\phi 1 + 4\pi/2)$, or components (0, $2\pi$). The phase difference is $2\pi$, which is the same as zero, or no phase difference. Constructive interference occurs, and output 3 is bright. Output 4 has components $\phi 2 = \phi 1 + 3\pi/2$ and $\phi 1 + \pi/2$, or components ($3\pi/2$, $\pi/2$), which differ by $\pi$, 180 degrees. Destructive interference keeps output 4 dark. FIG. 2B is a table showing the outputs of the 2×2 MMI as a function of various phase differences among the inputs.

FIG. 2C shows a 2×2 MMI-equivalent optical phase control circuit. The MMI device could be substituted by specific optical shift elements 91, 93 and Y-junctions or other couplers. Relative phase shifts of $\pi/2$ are produced on the path from input 1 to output 4 and on the path from input 2 to output 3. The MMI device of FIG. 2A and the shift elements of FIG. 2C are equivalent structures with the same function, both producing the shifts of FIG. 2B. Optical shift elements 91, 93 could be another type of SOA processed by lightly doped semiconductor material or any other optical material that could perform a similar function. Thus an equivalent to the MMI device is to use phase shifters with couplers.

FIGS. 3A–D show an optical buffer and inverter using a cross-phase modulation interferometer with SOA and MMI devices. In FIG. 3A, MMI splitter 22 has its input 1 as a no-connect, while input 2 is connected to a continuous-wave optical signal of wavelength $\lambda 1$. Since there is no signal for $\phi 1$, output 3 and 4 only have the $\phi 2$ component. The phase of upper output 3 is $\phi 2 + \pi/2$, while the phase of lower output 4 is $\phi 2$. When $\phi 2$ is set to zero, output 3 to SOA 10 has a phase of $\pi/2$, while output 4 to SOA 12 has a phase of 0. Thus MMI splitter 22 splits the continuous-wave signal into two branches with a $\pi/2$ phase difference. The optical power is split 50%–50% by MMI splitter 22. The 2×2 MMI devices can be 3 dB 2×2 MMI's to achieve this power splitting.

The two branches from MMI splitter 22 through SOA 10, 12 form a Mach-Zehnder Interferometer (MZI) when recombined by MMI combiner 24. MMI combiner 24 receives the upper branch from SOA 10 and filter 16 at its input 1, with a phase of $\phi 1$, while its input 2 receives the output from SOA 12 of the lower branch, with a phase of $\phi 2$. Note that $\phi 1$ and $\phi 2$ input to MMI combiner 24 are not necessarily the same phases $\phi 1$ and $\phi 2$ input to MMI splitter 22. The same phase designations are used for all inputs to MMI devices so that the table of FIG. 2B can be used when analyzing these circuits.

Optical logic input A is modulated in power over time, becoming relatively dark to represent a logical 0, and relatively bright to represent a logical 1. Input A is combined with output 3 of MMI splitter 22 and fed into SOA 10. A Y-junction can be used to combine these signals. The optical signal from input A is at wavelength $\lambda 2$, which is filtered out by filter 16 on the output of SOA 10.

Output 3 of MMI splitter 22 can have 50% of CW power, or 1*PH. Output 4 can have another 50% of the CW power or 1*PH. Each CW input can have 2*PH power.

SOA 10 and SOA 12 receive a bias current 11, 12, respectively, that adjust the phase shifts through them. Biases 11, 12 are adjusted so that the phase shift through SOA 10 is the same as the phase shift through SOA 12 when input A is 0 (dark).

However, when input A is a logical 1 (bright), the phase shift through SOA 10 changes. The additional power from input A causes SOA 10 to shift the phase of its output. The additional power changes the refractive index of the SOA and thus causes the phase shift. This phase shift causes the upper and lower branches that are applied to inputs 1, 2 of MMI combiner 24 to no longer have the same phase. A phase difference is introduced by the presence of light on input A. The bias currents 11, 12 can be adjusted so that when input A is in the logical 1 state, SOA 10 shifts phase by an additional 180 degrees ($\pi$). The high power level of input A, and the bias current 11 are carefully adjusted to achieve this $\pi$ phase shift.

FIG. 3B is a waveform of operation of the optical buffer-inverter of FIG. 3A. The continuous-wave input CW remains in a high-optical-power state with a power level 2*PH. When input A is low (dark), SOA 10 and SOA 12 have the same phase shift. The upper input 1 to MMI combiner 24 has a phase of $\pi/2$, while the lower input 2 to MMI combiner 24 has a phase of 0, due to the phase difference on the outputs of MMI splitter 22. Looking at the table of FIG. 2B, when φ1 is π/2 and φ2 is 0, output 3 has components (π/2, π/2), a phase difference of 0, and so has constructive interference. Thus output 3 (output C) is a logical 1, and its waveform is high. Output 4 (output B) has components (0, π), a phase difference of π, causing destructive interference, so it is a logical 0.

When input A is high, or in a high-optical power-state with a power level PH, SOA 10 is modulated to add a phase difference of π. MMI splitter 22 inputs a phase of π/2 to SOA 10. SOA 10 add a phase shift of π to this, producing a phase of π/2+π, or 3π/2 at the output of SOA 10. This phase shift of 3π/2 is also the phase φ1 of input 1 of MMI combiner 24.

The lower branch through SOA 12 has a zero relative phase shift, so φ2 on input 2 to MMI combiner 24 is 0. Of course, the actual phase shifts through each branch may be larger, but the relative phases are 3π/2 and 0.

Using 3π/2 for φ1 and 0 for φ2 in the table of FIG. 2B shows that output 3 (logic-gate output C) has components (3π/2, π/2), a phase difference of π, resulting in destructive interference, so output C is dark, or logical 0, when A is high. Output 4 (B) has components (0, 2π), a phase difference of 2π or 0, so constructive interference occurs, and output B is at high power, or logic 1. Constructive interference combines the power from 50% PH input 2 and the 50% PH power from input 1 of MMI combiner 24.

FIG. 3C is a truth table for the optical inverter-buffer of FIG. 3A. When input A is low (0), the inputs to MMI combiner 24 have relative phases φ1 of π/2 and φ2 of 0. Using the table of FIG. 2B, these phase inputs produce outputs of 0 (destructive interference) for output B (MMI output 4) and 1 (constructive interference) for upper output C (MMI output 3).

FIG. 3D shows logic symbols for the optical inverter-buffer of FIG. 3A. The truth table and waveforms show that output C is the inverse of A, while output B is the same as A. Thus the optical circuit can be represented as a buffer with input A and output B, and an inverter with input A and output C. An additional input is required, the continuous-wave input CW at wavelength λ1. The input A wavelength λ2 is converted to wavelength λ1.

The use of MMI splitter 22 and MMI combiner 24 helps to more easily manage power levels in the circuit. The logic output levels are determined by the phase differences between the upper and lower branches (arms) of the Mach-Zehnder Interferometer (MZI). Having MMI combiner 24 conveniently provides both the true and complement outputs without requiring additional inverter components. By adding power management to a cross-phase modulation (XPM) MZI circuit, input A and outputs B, C can easily be maintained at the same power level.

FIGS. 4A–C show an optical interferometer OR-NOR gate with a power-reducing SOA. The optical circuit is similar to that described for FIG. 3A, except that an OR function is added in place of the A input to upper SOA 10. This OR function includes MMI 52 and power-reducing SOA 54. MMI 52 is a 2×1 MMI with a single output that combines inputs A and B with no relative phase shift.

The combined output of MMI 52 is the logical OR of inputs A and B. When either A or B or both A and B are high (bright), the output of MMI 52 is also bright (high). When both A and B are dark, the output of MMI 52 is dark (low).

Since the power output by MMI 52 could be double the standard high power level when both A and B are high, power-reducing SOA 54 is used. Power-reducing SOA 54 is biased so that its output power is reduced to about the high power level when either or both A and B are high, but the standard low power level when both A and B are low.

The output of power-reducing SOA 54 is thus (A OR B). Substituting (A OR B) for A in the truth table of FIG. 3C yields the truth table of FIG. 4B. The last 3 rows correspond to the output of power-reducing SOA 54 being high. In that state, SOA 10 produces a phase shift of π relative to SOA 12. Adding the π/2 phase difference produced by MMI splitter 22 yields inputs to MMI combiner 24 of φ1=3π/2 and φ2=0. From FIG. 2B, output 3 (D) has components (3π/2, π/2), a phase difference of π, destructive interference, and is thus low. Output 4 (C) has components (0, 2π), a phase difference of 2π, constructive interference, and is thus high.

For the first row of the table of FIG. 4B, both A and B are low. The output of power-reducing SOA 54 is low, so no extra phase shift is produced by SOA 10. Then the inputs to MMI combiner 24 are φ1=π/2 and φ2=0. From FIG. 2B, output 3 (D) has components (π/2, π/2), a phase difference of 0, constructive interference, and is thus high. Output 4 (C) has components (0, π), a phase difference of π, destructive interference, and is thus low.

FIG. 4C shows that the optical logic of FIG. 4A is equivalent to a NOR gate producing output D, and an OR gate producing output C. The two inputs A, B are converted in wavelength from λ2 to λ1. The constant continuous-wave input is at the output's wavelength λ1.

FIGS. 5A–C show an optical XOR-XNOR gate using an MMI splitter and combiner. The continuous-wave input is applied to input 2 of MMI splitter 22, resulting in two equal-power optical signals with a π/2 phase difference. Logical or modulated input A is merged with the upper path with the π/2 phase shift and input to SOA 10, while logic input B is merged with the lower path with the 0 phase shift and input to SOA 12.

Optical signals A, B have wavelength λ2, which is removed from both the upper and lower paths by filters 16, 18. Thus the logic-gate outputs C, D from MMI combiner 24 have wavelength λ1.

When A and B are both logic 0 (dark), the upper and lower SOA 10, 12 have the same relative phase shift, 0 due to their biasing 11, 12. The upper path to φ1 has a phase shift of π/2, while the lower path to φ2 has 0 relative phase shift. From FIG. 2B, when the inputs to MMI combiner 24 are π/2, 0, the outputs are logic 1 for the upper output D and logic 0 for the lower output C. This is the first row of the truth table of FIG. 5B.

When input A is 1 (bright) and input B is 0 (dark), the added power to SOA 10 causes an additional phase shift of π through SOA 10 relative to SOA 12. The phase shift in the upper path is π/2 from MMI splitter 22 and π from SOA 10, so φ1 is 3π/2. The lower-path phase shift is 0, so φ2 is 0. From FIG. 2B, when the inputs to MMI combiner 24 are 3π/2, 0, the outputs are logic 0 for the upper output D and logic 1 for the lower output C. This is shown in the third row of FIG. 5B.

When input A is 0 (dark) while input B is 1 (lit), the added power to SOA 12 causes an additional phase shift of π through SOA 12 relative to SOA 10. The phase shift in the upper path is π/2 from MMI splitter 22 and 0 from SOA 10, so φ1 is π/2. The lower-path phase shift is 0 from MMI splitter 22 and π from SOA 12, so φ2 is π. From FIG. 2B, when the inputs to MMI combiner 24 are π/2, π, the outputs are logic 0 for the upper output D and logic 1 for the lower output C. This is shown in the second row of FIG. 5B.

When both inputs A, B are lit (logic 1), both of SOA 10, 12 have an added phase shift of π due to the increased power from the logic inputs A, B. The upper path has a phase shift of π/2 from MMI splitter 22 and π from SOA 10, for a total of 3π/2 for φ1, while the lower path has relative phase shift of π due to SOA 12. From FIG. 2B, when the inputs to MMI combiner 24 are 3π/2, π, the outputs are logic 1 for the upper output D and logic 0 for the lower output C. This is the last row of the truth table of FIG. 5B.

FIG. 5C shows that the optical circuit of FIG. 5A can be represented as an XOR gate producing C and an XNOR gate producing D from inputs A, B and the continuous-wave input.

FIGS. 6A–C show an AND gate using an interferometer with SOA and MMI devices but without a continuous-wave input. In FIG. 6A, modulated logic input B replaces the continuous-wave input CW of the inverter-buffer of FIG. 3A, and output C is moved to the lower output of MMI combiner 24 where output D was. Thus, when input B is high (logic 1), the circuit operates as a non-inverting buffer to output C, buffering input A as described for FIG. 3A. This is seen in the second and fourth rows of the truth table of FIG. 6B, where B is 1.

When logic input B is 0 (dark), the absence of an optical signal (or a signal of very low power) causes the lower path from MMI splitter 22 through SOA 12 to MMI combiner 24 to be dark. Thus φ2 to MMI combiner 24 is not present. The only optical signal is from input A, which has a wavelength of λ2. Filter 16 blocks this wavelength, so no optical signal from input A can reach the upper input to MMI combiner 24. Since both inputs to MMI combiner 24 are dark, its outputs are also dark. Thus when input B is dark, output C must also be dark. This is shown in the first and third rows of the truth table of FIG. 6B. The phases φ1, φ2 of the inputs to MMI combiner 24 are both 0, but the absence of an optical signal of sufficient power keeps the outputs dark, which is a logical 0.

FIG. 6C shows that the optical circuit is a AND gate producing C from inputs A and B. No continuous-wave is needed. The inputs have difference wavelengths: input A has wavelength λ2, while input B and output C have wavelength λ1. Having difference wavelengths for the inputs can be a disadvantage in some applications, but may be acceptable in other applications.

Another disadvantage is a power management issue. In this AND optical logic, in order to keep the input and output at about same power level, input B is at 2*PH and input A is at 1*PH. In some applications, input B can be used as a control input and A as a signal input. Then output C has the about same power level PH. The counter-propagate method can be used for input A, injecting the power from right hand side of SOA 10. The same wavelength can be used for input A and input B and also eliminate using a filter. But the disadvantage is that the input A could disturb the input B.

Figure 7:
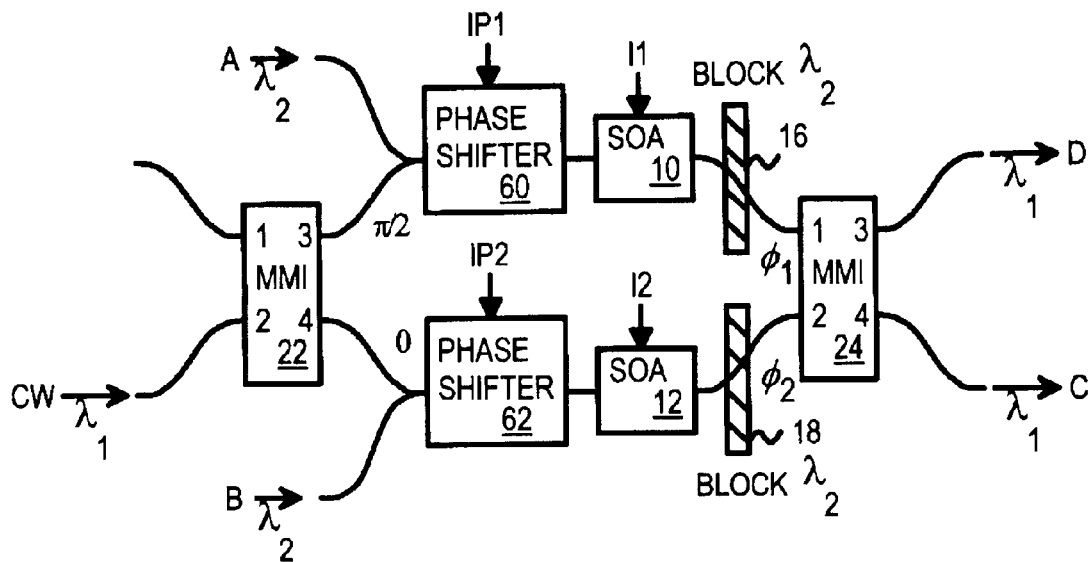
FIG. 7 shows an optical XOR-XNOR gate with added phase shifters to better adjust relative phase shifts.

FIG. 7 shows an optical XOR-XNOR gate with separate phase shifters to better adjust relative phase shifts and gains. The biasing currents 11 to SOA 10 and 12 to SOA 12 must be carefully pre-selected to ensure that SOA 10, 12 have the same phase shift when logic inputs A, B are dark, but an added relative phase shift of π when the logic input to an SOA is bright, or at the pre-determined high optical power level. When both A and B are lit, SOA 10, 12 again need to have the same relative phase shift, even through the added optical power increases the absolute phase shift in each SOA. This can be a challenging design goal, especially for more complex logic gates.

The CW input can have a 2*PH CW, so that output C or output D has an optical power of 1*PH. Two criteria should be maintained. One criteria is the relative phase shift π(or no phase shift) created on the end of upper and lower arms. The second criteria is to keep the same optical power on the end of upper and lower branches or arms. With the same gain or same optical power on input 1 and input 2 of MMI 24, or 1*PH on end of each arms, input 1 distributes 0.5×PH optical power to output D and C respectively. Input 2 also distributes 0.5×PH optical power to output C and D respectively. Therefore the last stage 3 dB 2×2 MMI could have one output constructively restore power to 1*PH and another output port destructively reduce power to 0. For better control phase and gain, the SOAs can be separated into two sections: phase control and gain control. Usually the phase control SOA can be made from a lightly-doped-material SOA or some optical shift element that performs the same function. The gain-control SOA can be made by a heavily-doped-material SOA.

Mis-matches in the upper and lower paths can add phase shifts beyond the shifts created by SOA's 10, 12. For example, waveguides or fiber channels connecting MMI splitter 22, SOA's 10, 12, filters 16, 18, and MMI combiner 24 may have slightly different lengths, indexes of refraction, reflections, or other variances that can change phase. The phase may also depend on the wavelength and vary between λ1 and λ2. While the bias currents can be adjusted to compensate for these variations, each manufactured logic gate may have to be separately measured to determine the bias currents for that particular device. When input A and input B are at different power levels, one at logic 0 and the other at logic 1, the extra gain created from inputs A and B for wavelength λ2 are blocked by the filter. Therefore, the optical wave reaching port 1 and port 2 of 3 dB 2×2 MMI 24 combine to have about the same power level.

Phase shifters 60, 62 are added to allow more flexible adjustment of the phase shifts in the two paths of the interferometer. The phase of the upper arm can be adjusted through bias current 11 to SOA 10, and by bias IP1 to phase shifter 60. Likewise, The phase of the lower arm can be adjusted through bias current 12 to SOA 12, and by bias IP2 to phase shifter 62. Since up to 4 adjustments can be made, better matching of the phase shifts to the targets can occur. Phase shifters 60, 62 could have a coarser or a finer dependence on the bias, allowing for both coarse and fine adjustments to be made. Phase shifter 60, and 62 does not have to be extra components. The SOA can be separated into two sections. Phase shifter 60 can be a lightly-doped region of SOA 10 created by an ion implanter.

Figure 8:
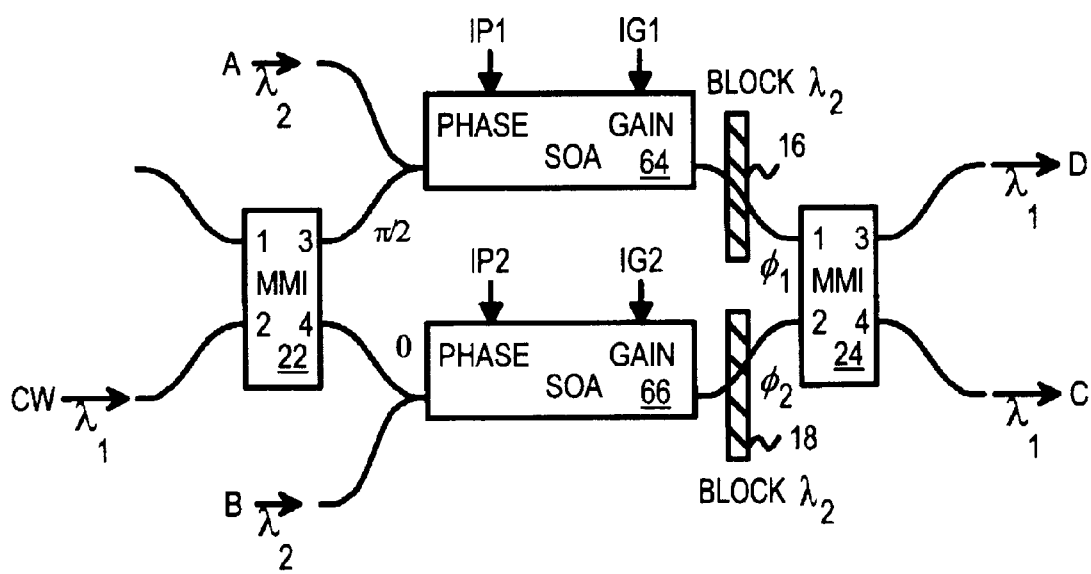
FIG. 8 shows an optical XOR-XNOR gate with an integrated phase-gain shifters to adjust relative phase shifts.

FIG. 8 shows an optical XOR-XNOR gate with an integrated phase-gain shifters to adjust relative phase shifts. Rather than have separate phase shifters in each arm of the interferometer, the SOA devices can be replaced with a more complex SOA. Phase and gain adjustable SOA 64 has at least two bias controls: bias IG1 controls the SOA gain, while bias IP1 controls the phase shift. Likewise, phase and gain adjustable SOA 66 has bias controls IG2 for the SOA gain, and IP2 for the phase shift. The separate gain control is useful for better adjusting optical power levels.

Figure 9:
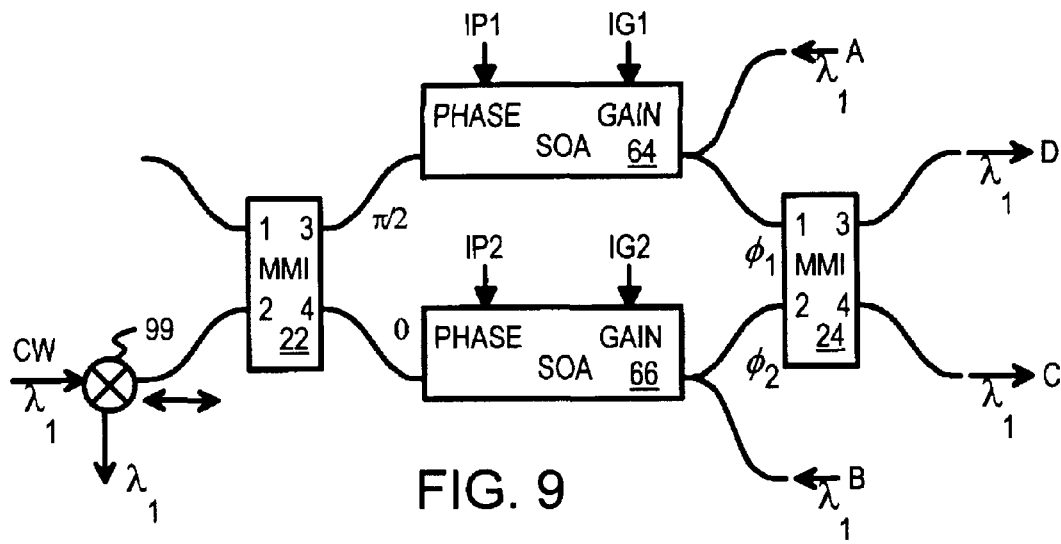
FIG. 9 is a counter-propagate optical logic gate using an interferometer with MMI devices.

FIG. 9 is a counter-propagate optical logic gate using an interferometer with MMI devices. Rather than have all logic signals propagate in the same direction as the continuous-wave input (co-propagation), the logical inputs can be introduced into the logic circuit in the reverse direction. This has the advantage of eliminating the filters, and all inputs and outputs can have the same wavelength λ1.

The disadvantage of this structure is the logic input could disturb the input CW. If the CW is an outside laser source there may be no problem, as an individual laser source might have an isolated device to block any incoming optical power and to prevent potential damage to the laser source. However, the problem may be more serious for integrated optics that have the CW laser source built into a single chip.

To overcome this problem, isolator or circulator 99 can be included between the CW input source and MMI splitter 22. Any optical signal of wavelength $\lambda 1$ propagating in the reverse direction from MMI splitter 22 is removed by circulator 99.

MMI splitter 22 splits the continuous-wave input into two equal-power signals for the upper and lower branches of the interferometer. The upper signal to phase and gain adjustable SOA 64 has a phase shift of $\pi/2$ relative to the 0 phase shift for the lower signal to phase and gain adjustable SOA 66.

The modulated optical inputs A, B are introduced to the output side of SOA's 64, 66, so that their signals travel in an opposite direction to that of the continuous-wave signal. However, cross-phase modulation within SOA's 64, 66 still occurs as the two optical signals interact with the SOA cavity medium. When signal A is lit, the additional optical power in SOA 64 causes an added phase shift of $\pi$ to the continuous-wave signal, resulting in the output of SOA 64 having a total relative shift of $3\pi/2$. Thus upper input 1 to MMI combiner 24 has $\phi 1=3\pi/2$ when A is lit, but is $\pi/2$ when A is dark.

Likewise, when signal B is lit, the additional optical power in SOA 66 causes an added phase shift of $\pi$ to the continuous-wave signal in the lower path, resulting in the output of SOA 66 having a total relative shift of $\pi$. Thus lower input 2 to MMI combiner 24 has $\phi 2=\pi$ when B is lit, but is 0 when B is dark. This is the same relative phase shift as shown in the truth table of FIG. 5B, which yields a XOR function to C and an XNOR function to output D. Other logic gates such as NOR, AND, etc. can also be implemented in the counter-propagate mode rather than the co-propagate mode shown earlier.

Figure 10:
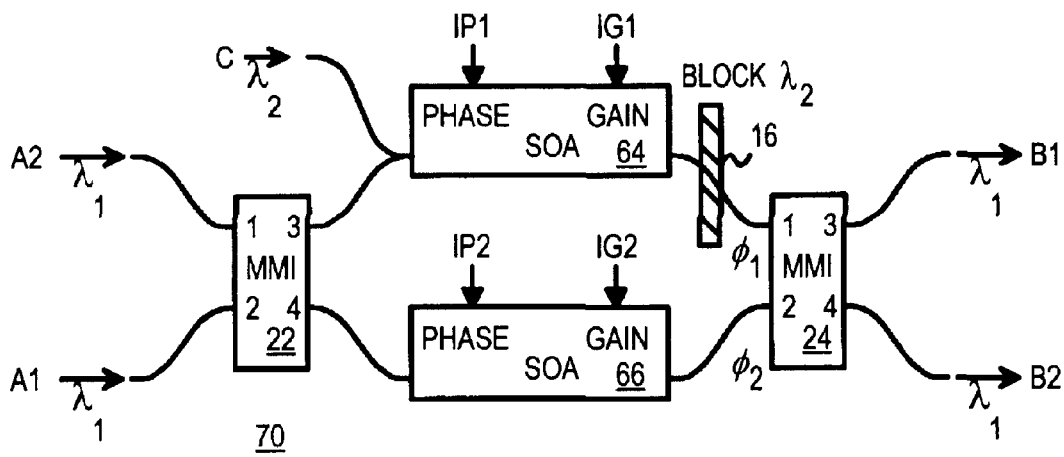
FIG. 10 is an optical-switch cell.

FIG. 10 is an optical-switch cell. Optical switches or multiplexers are important applications of optical logic gates. A basic 2×2 optical switch 70 is shown.

Control input C causes input A1 to pass through to output B1, and input A2 to pass through to output B2 when C=0, but crosses-over when C=1, so that A1 is output as B2, while A2 is output as B1.

Control input C is at wavelength $\lambda 2$, while inputs A1, A2 and outputs B1, B2 are at wavelength $\lambda 1$. Filter 16 blocks $\lambda 2$, removing the control signal from the outputs.

When control input C is low, SOA 64, 66 have the same relative phase shift, or 0. When A1 and A2 are both dark, all inputs to the circuit are dark and so outputs B1, B2 must also be dark. When A2 is dark but A1 is bright (1), the upper arm to SOA 64 has a phase shift of $\pi/2$ relative to the 0 phase shift of the lower arm to SOA 66. Since SOA 64, 66 have the same phase shift, the relative phases input to MMI combiner 24 are $\phi 1=\pi/2$ and $\phi 2=0$. From FIG. 2B, the upper output B1 is 1 while the lower output B2 is 0. Thus A1 is passed to B1, and A2 is passed to B2.

When A1 is dark but A2 is bright (1), the lit input is applied to the upper input of MMI splitter 22 rather than the lower input. Then the lower arm to SOA 66 has a phase shift of $\pi/2$ relative to the 0 phase shift of the upper arm to SOA 64. Since SOA 64, 66 have the same phase shift, the relative phases input to MMI combiner 24 are $\phi 1=0$ and $\phi 2=\pi/2$. From FIG. 2B, the upper output B1 is 0 while the lower output B2 is 1. Thus A1 is passed to B1, and A2 is passed to B2.

When control input C is bright (logic 1), then additional optical power is applied to SOA 64. This additional power causes an added phase shift of $\pi$ in SOA 64 relative to SOA 66.

When both inputs A1, A2 are dark, the only light is from input C at wavelength $\lambda 2$, which is blocked by filter 16. The outputs B1, B2 are thus dark.

When A2 is dark (0) but A1 is bright (1), the upper arm to SOA 64 has a phase shift of $\pi/2$ relative to the 0 phase shift of the lower arm to SOA 66. Since SOA 64 has an extra shift of $\pi$, the relative phases input to MMI combiner 24 are $\phi 1=3\pi/2$ and $\phi 2=0$. From FIG. 2B, the upper output B1 is 0 while the lower output B2 is 1. Thus A1 is crossed-over to B2, and A2 is crossed-over to B1.

When A1 is dark (0) but A2 is bright (1), the lit input is applied to the upper input of MMI splitter 22 rather than the lower input. Then the lower arm to SOA 66 has a phase shift of $\pi/2$ relative to the 0 phase shift input to SOA 64. Since SOA 64 has an extra phase shift of $\pi$, the relative phases input to MMI combiner 24 are $\phi 1=\pi$ and $\phi 2=\pi/2$. From FIG. 2B, the upper output B1 is 1 while the lower output B2 is 0. Again A1 is crossed-over to B2, and A2 is crossed-over to B1.

Figure 11:
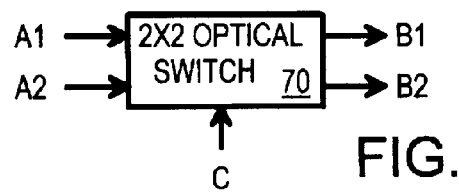
FIG. 11 is a diagram showing the optical switch cell of FIG. 10.

FIG. 11 is a diagram showing the optical switch cell of FIG. 10. Optical switch 70 has 2 data inputs A1, A2 and 2 outputs B1, B2. Control input C causes A1 to pass to B1, and A2 to pass to B2 when C=0. A1 crosses-over to B2, and A2 to B1, when C=1.

Optical switch 70 can also be used with fewer than all data inputs and outputs. For example, one of the outputs can be a no-connect, producing a 2×1 switch. When only one data input (A2) is connected, and the other is kept dark, both outputs can be used, producing a 1×2 switch. When only one input (A2) and one output (B2) are connected, optical switch 70 can operate as a 1×1 switch.

Figure 12A:
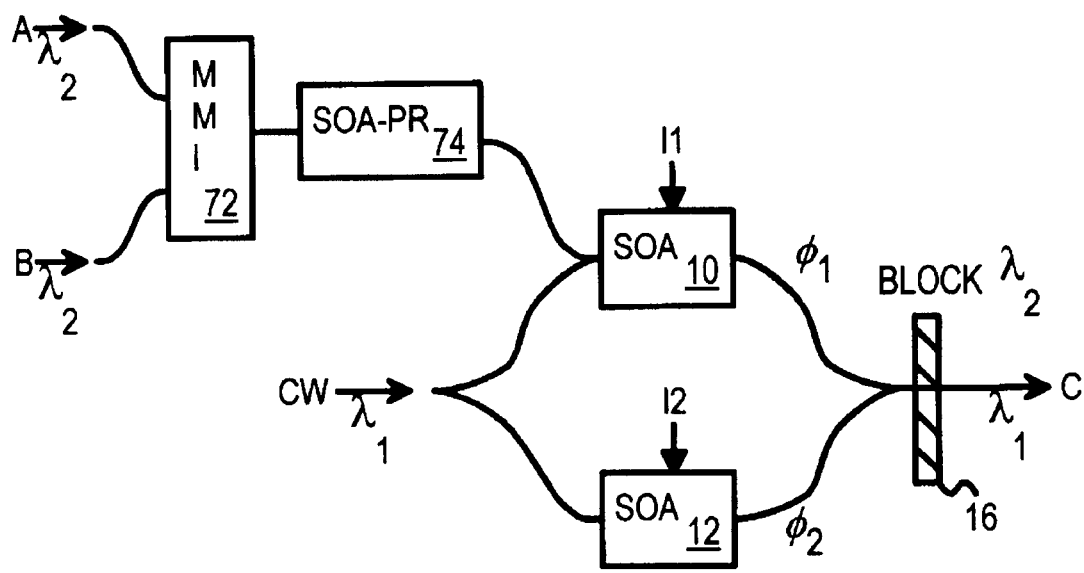
FIGS. 12A–B show an optical NOR gate with a power-restoring SOA and MMI phase-shift devices.
Figure 12B:
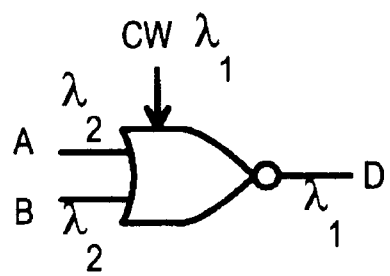

FIGS. 12A–B show an optical NOR gate with a power-restoring SOA and MMI phase-shift devices. For some embodiments, the MMI splitter and combiners can be replaced with Y-junctions. The lack of the MMI splitter causes SOA 10, 12 to each receive the continuous-wave input with the same phase, or zero phase difference among the two branches of the interferometer. Another Y-junction replaces the MMI combiner to produce the final output C after filter 16 removes wavelength $\lambda 2$. Using a Y-junction instead of an MMI device, only 1*PH power is needed for CW.

The logical inputs A and B are combined by MMI 72, a 2×1 MMI device. The combined output from MMI 72 or just a Y-junction coupler is applied to power-reducing SOA 74.

When A and B are both 0 (dark), SOA 74 outputs little or no power to SOA 10. When SOA 10 receives no significant signal from SOA 74, it has about the same phase shift as SOA 12, so that the upper and lower paths have a near-zero phase difference. Constructive interference occurs as the combining Y-junction, producing a bright (logic 1) output C.

When either or both of inputs A, B are lit, SOA 74 outputs a signal with significant optical power to SOA 10. The phase shift of SOA 10 changes or is modulated, so that the upper path has a phase shift of $\pi$ relative to the lower path. Destructive interference occurs at the combining Y-junction, producing a dark output C. Thus the optical circuit is a NOR function. FIG. 12B highlights that output C is the NOR of inputs A, B, but has the same wavelength $\lambda 1$ as the continuous-wave input.

When both inputs A, B are high, power-reducing SOA 74 acts to reduce the optical power level. The power level of the output of power-reducing SOA 74 is kept to near the target power level for the logic high state. SOA 74 is biased so that its output is near the high power level whether one or both of the A, B inputs are high. Such power-restoring SOA's are described more fully in the parent application.

In some embodiments, SOA 12 can be replaced by other devices, or even eliminated altogether. When the absolute phase shift through SOA 10 is small, SOA 12 could be replaced by a fiber waveguide or other material with about the same phase shift as SOA 10. Then the bias 11 to SOA 10 could be adjusted to match the phase shifts in the upper and lower paths so that a zero relative phase shift occurs when SOA 74 outputs a dark signal, but the two paths have a $\pi$ phase difference when SOA 74 outputs a high optical signal to SOA 10. Of course, inclusion of SOA 12 provides better matching of phase shifts in the two paths, and more flexibility in biasing.

Figure 13A:
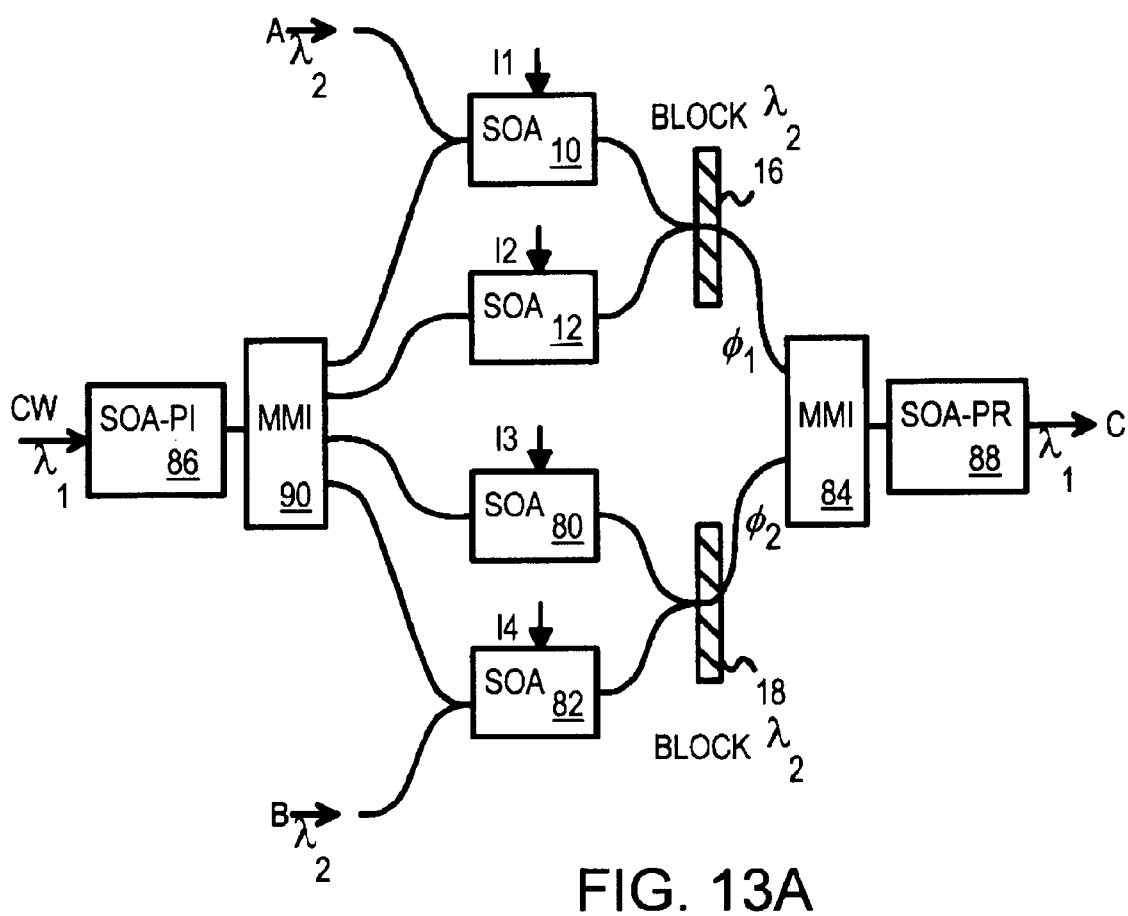
FIGS. 13A–B show an interferometer-based optical NAND gate with a power-increasing SOA and a power-restoring SOA.
Figure 13B:
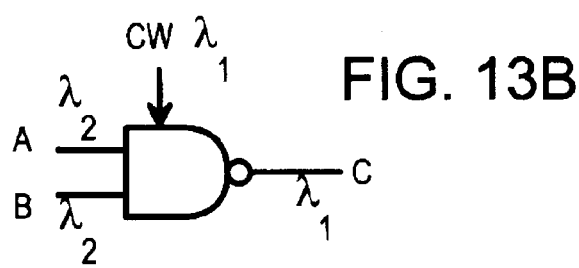

FIGS. 13A–B show an interferometer-based optical NAND gate with a power-increasing SOA. The power level of the input continuous-wave signal CW is doubled from the high power level PH to 2×PH by power-increasing SOA 86. The boosted power continuous-wave signal is split by 1×4 MMI splitter 90 into four paths. Each path has a continuous-wave signal with half the high level, or 0.5×PH. All four outputs from MMI splitter 90 have the same phase shift, or a relative phase of 0.

When inputs A and B are both dark, SOA's 10, 12, 80, 82 have unity gain and equal phase shifts, so that no phase difference occur among the four branches. The outputs of SOA 10, 12 are combined by a Y-junction and any signal from input A at wavelength $\lambda 2$ is blocked by filter 16 before being applied to the upper input of 2×1 MMI combiner 84. For the lower two branches, the outputs of SOA 80, 82 are combined by another Y-junction and any signal from input B at wavelength $\lambda 2$ is blocked by filter 18 before being applied to the lower input of MMI combiner 84. MMI combiner 84 combines these signals.

Since each signal has an optical power of about 0.5×PH, the total signal power after MMI combiner 84 is 2×PH. Power-reducing SOA 78 reduces the power from 2×PH to PH to restore the logic-high power level.

When input A is high, the additional optical power input to SOA 10 causes an added phase shift of $\pi$ in the upper branch relative to the second branch through SOA 12. The phase difference of $\pi$ causes destructive interference at the upper Y-junction, resulting in a dark signal being applied to the upper input of MMI combiner 84. MMI combiner 84 then simply passes through the signal at its lower input.

When input B is high, the additional power into SOA 82 causes an added phase shift of $\pi$ through the fourth branch relative to the third branch through SOA 80. The phase difference of $\pi$ causes destructive interference at the lower Y junction. A dark signal is applied to the lower input of MMI combiner 84. When A is also high, the upper input to MMI combiner 84 is also dark, so MMI combiner 84 outputs a dark signal to power-reducing SOA 78. Output C is then dark (low).

When B is high but A is low, SOA 82 has the added phase shift of $\pi$, while SOA 10 has no added phase shift. Destructive interference occurs for the lower Y-junction, but constructive interference for the upper Y junction. The upper input to MMI combiner 84 has a power of PH, while the lower input is dark. MMI combiner 84 then outputs a signal with power PH to power-reducing SOA 88. From FIG. 2 of the parent application, the design of the SOA provides a gain of 0 dB for a 1×PH-level power input. Thus output C of power-restoring SOA 88 sustains the PH power level. Hence, output C obtains logic 1.

FIG. 13B shows that the circuit is equivalent to a NAND gate with inputs A, B and output C. The continuous-wave input and output C have the same wavelength $\lambda 1$, while the logic inputs A, B have wavelength $\lambda 2$.

ALTERNATE EMBODIMENTS

Several other embodiments are contemplated by the inventors. For example, larger MMI devices could be used, and logic gates with more inputs produced. Even larger, more complex logic functions with multiple inputs are contemplated, such as AND-OR networks.

Semiconductor optical amplifiers (SOA's) can be constructed from a variety of materials. Rather than use an electrical bias current to the SOA's, an optical pump bias could be used, or some other energy-adding method. The SOA's or phase shifters could also operate with a phase shift that is normally $\pi$, or some other value, rather than normally 0, in the absence of optical power from the logic input signal. The bias could be fixed into the SOA's or the branches. The relative phase shifts of the two SOA's could also be set to differ in the absence of optical power from logic input signal. The MMI's could vary in design and have diagonal phase shifts other than $\pi/2$.

While the phase differences among the two SOA's has been described, a person with skill in the art will realize that the phase shift differences among the two paths in the interferometer are critical, not just the phase shifts of the SOA's. Phase shifts can advance phase or delay phase. However, the primary phase difference is due to the SOA's, so the phase difference is simply referred to as being caused by the SOA's to simplify the explanations. When the paths add significant phase differences, the path differences can be compensated by additional biasing of the SOA's to make the phase shift of the upper path match the phase shift of the lower path.

One benefit of using semiconductor optical amplifiers (SOAs) for optical inverters is that SOA's are inherently amplifying devices. Power levels are restored or boosted by the optical inverters, compensating for any losses. Thus the optical logic using optical inverters is self-restoring. The power levels of the inputs to the optical inverters can be adjusted to vary the amplification, and the SOA's themselves may be modified or optimized in a variety of ways to adjust amplification.

An optical input wave-guide can be an optical fiber, such as a strand of a fiber-optic cable, or a guide formed on a substrate, such as a groove or a transparent layer formed on the substrate.

Rather than be completely dark when the modulated input or output is low, the optical power may be low but still somewhat present. The low optical power can be detected as a low if the optical power is below a threshold of a sensor. The optical inverter can still be useful even when the output is still somewhat on for logic 0.

Power management is a consideration. Both fan-in and fan-out should be considered for power matching. When an output is going to drive several inputs, such as 4 downstream inputs, then the output needs to use an SOA that increases power by 4 before sending the output to the downstream optical inputs.

Multiple outputs can be provided on the SOA's and MMI devices to save logic gates at the cost of more power. Alternatively, only one output could be provided at the cost of more logic gates to provide for more outputs but at less power.

The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. 37 C.F.R. §1.72(b). Any advantages and benefits described may not apply to all embodiments of the invention. When the word "means" is recited in a claim element, Applicant intends for the claim element to fall under 35 USC §112, paragraph 6. Often a label of one or more words precedes the word "means". The word or words preceding the word "means" is a label intended to ease referencing of claims elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word means are not intended to fall under 35 USC §112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An optical logic element comprising:
a multi-mode interference (MMI) splitter, receiving a first optical signal, for generating a first splitter output and a second splitter output from the first optical signal;
a first semiconductor optical amplifier (SOA), receiving the first splitter output from the MMI splitter, for phase modulating an optical signal on the first splitter output to generate a first branch signal, the first SOA modulating a phase of the first branch signal in response to a second optical signal;
a second branch, receiving the second splitter output from the MMI splitter, for generating a second branch signal; and
a MMI combiner, coupled to receive the first branch signal and the second branch signal, for combining the first and second branch signals to generate an output;
wherein a first logic state of the output is generated by the MMI combiner combining the first and second branch signals wherein constructive interference occurs, while a second logic state of the output is generated by the MMI combiner when destructive interference occurs;
when the second optical signal changes logic state, the first SOA modulates the phase of the first branch signal relative to the phase of the second branch signal, causing the MMI combiner to alter the logic state of the output.

2. The optical logic element of claim 1 wherein the second optical signal is introduced into the first SOA in a counter-propagation mode opposite the first splitter output.

3. The optical logic element of claim 1 wherein when the second optical signal is introduced into the first SOA in a co-propagation mode with the first splitter output, the optical logic element further comprising:
a filter, coupled between the first SOA and the MMI combiner, for blocking a wavelength of the second optical signal, but for passing a wavelength of the first optical signal.

4. The optical logic element of claim 1 wherein the first SOA increases a phase of the first branch signal by about $\pi$ when the second optical signal is in logic state represented by high-optical-power.

5. The optical logic element of claim 1 wherein the MMI splitter has a first and a second input, and a third and a fourth output;
wherein the MMI splitter receives the first optical signal at the second input but receives no lit signal at the first input;
wherein the third output has a phase shift of about $\pi/2$ relative to the fourth output, whereby the MMI splitter introduces a $\pi/2$ phase difference between the first and second splitter outputs.

6. The optical logic element of claim 5 wherein the MMI combiner has a first and second input and a third and fourth output;
wherein a first diagonal component has a phase of the first input increased by about $\pi/2$;
wherein a second diagonal component has a phase of the second input increased by about $\pi/2$;
wherein the third output is in a bright state when constructive interference occurs between the first input and the second diagonal component but dark when destructive interference occurs between the first input and the second diagonal component;
wherein the fourth output is in a bright state when constructive interference occurs between the second input and the first diagonal component but dark when destructive interference occurs between the second input and the first diagonal component;
wherein the MMI combiner generates a true output and a complement output.

7. The optical logic element of claim 6 wherein the first optical signal is a modulated signal that is modulated to represent logic states of a first logic input;
whereby the optical logic element is an AND function of the first and second optical signals, an AND output being the fourth output of the MMI combiner.

8. The optical logic element of claim 6 wherein the first optical signal is a continuous-wave signal,
whereby the optical logic element is an inverter-buffer of the second optical signal to the third and fourth outputs of the MMI combiner.

9. The optical logic element of claim 6 wherein the first optical signal is a continuous-wave signal;
wherein the second branch comprises a second SOA that receives the second splitter output from the MMI splitter and a third optical signal, for phase modulating an optical signal on the second splitter output to generate the second branch signal, the second SOA modulating the phase of the second branch signal in response to the third optical signal;
when the third optical signal changes logic state while the second optical signal does not change logic state, the second SOA modulates the phase of the second branch signal relative to the phase of the first branch signal, causing the MMI combiner to alter the logic state of the output,
whereby the optical logic element is an exclusive-OR (XOR) or an exclusive-NOR (XNOR) of the second and third optical signals.

10. The optical logic element of claim 6 further comprising:
a power-reducing SOA that generates the second optical signal;
a junction MMI device, receiving a first logic input and a second logic input, for combining optical signals for the first and second logic inputs to generate an OR-ed signal to the power-reducing SOA;

wherein the junction MMI device and the power-reducing SOA generate the second optical signal as a logical OR of the first and second logic inputs;

wherein the first optical signal to the MMI splitter is a continuous-wave signal, whereby the optical logic element is an OR gate or a NOR gate of the first and second logic inputs to the output of the MMI combiner.

11. The optical logic element of claim 6 further comprising:

a first phase shifter, for adding a phase shift to the first splitter output;

a second phase shifter for adding a phase shift to the second splitter output.

12. The optical logic element of claim 6 wherein the first SOA comprises a gain and phase adjustable SOA, with a gain bias input for adjusting gain modulation by the first SOA and a phase bias input for adjusting phase modulation by the first SOA.

13. An interferometer logic gate comprising:

splitter means, receiving a first optical signal, for generating an upper branch signal and a lower branch signal;

upper semiconductor optical amplifier (SOA) means, receiving the upper branch signal, for adding a phase shift to the upper branch signal when a control optical signal is in a high power state, but for not adding the phase shift to the upper branch signal when the control optical signal is in a low power state;

lower SOA means, receiving the lower branch signal, for buffering the lower branch signal; and combiner means, receiving the upper branch signal from the upper SOA means, and receiving the lower branch signal from the lower SOA means, for generating an upper and a lower output, the upper output resulting from constructive or destructive interference of the upper branch signal and a diagonal lower branch signal, while the lower output resulting from constructive or destructive interference of the lower branch signal and a diagonal upper branch signal, wherein the diagonal upper branch signal is the upper branch signal with an added phase shift while the diagonal lower branch signal is the lower branch signal with the added phase shift.

14. The interferometer logic gate of claim 13 wherein the combiner means is a multi-mode-interference (MMI) device or the combiner means comprises a first phase sifter coupled between the upper branch signal and the diagonal upper branch signal, and a second phase sifter coupled between the lower branch signal and the diagonal lower branch signal, the first and second phase shifters adding the phase shift to the upper and lower branch signals.

15. The interferometer logic gate of claim 13 wherein the control optical signal is applied to the upper SOA means in a counter-propagation direction at an end of the upper SOA means coupled to the combiner means.

16. The interferometer logic gate of claim 15 further comprising:

isolating means, coupled between first optical signal and an input to the splitter means, for isolating the control optical signal from the first optical signal.

17. The interferometer logic gate of claim 13 wherein the control optical signal is applied to the upper SOA means in a co-propagation direction at an end of the upper SOA means coupled to the splitter means;

further comprising:

filter means, coupled between the upper SOA means and the combiner means, for blocking a wavelength of the control optical signal but for passing a wavelength of the first optical signal.

18. The interferometer logic gate of claim 13 wherein the splitter means also receives a second optical signal, the splitter means generating a diagonal first splitter signal as the first optical signal with the added phase shift and generating a diagonal second splitter signal as the second optical signal with the added phase shift;

the splitter means generating the upper branch signal by combining the first optical signal and the diagonal second splitter signal;

the splitter means generating the lower branch signal by combining the second optical signal and the diagonal first splitter signal, whereby the interferometer logic gate is a 2×2 optical switch.

19. The interferometer logic gate of claim 18 wherein the added phase shift is about $\pi/2$, while the phase shift added by the upper or lower SOA means is about $\pi$.

20. The interferometer logic gate of claim 13 wherein the first optical signal is a continuous-wave signal while the control optical signal is modulated to represent logic states, wherein the interferometer logic gate is an inverter of the control optical signal to the upper output, and a buffer of the control optical signal to the lower output.

21. The interferometer logic gate of claim 13 wherein the first optical signal is a continuous-wave signal while the control optical signal is modulated to represent logic states, wherein the lower SOA means further receives a second control optical signal modulated to represent logic states, the lower SOA means further for adding a phase shift to the lower branch signal when the second control optical signal is in a high power state, but for not adding the phase shift to the lower branch signal when the second control optical signal is in a low power state;

wherein the interferometer logic gate is an exclusive-NOR (XNOR) gate of the control optical signal and the second control optical signal to the upper output, and a exclusive-OR (XOR) gate of the control optical signal and the second control optical signal to the lower output.

22. An optical NAND gate comprising:

a continuous-wave input having a high power level;

a power-increasing semiconductor optical amplifier (SOA), receiving the continuous-wave input, for increasing optical power of the continuous-wave input to generate a boosted signal having a boosted power greater than the high power level;

a multi-mode interference (MMI) splitter, receiving the boosted signal, for generating four branch signals each having about one-quarter of the boosted power of the boosted signal;

a first SOA, receiving a first branch signal of the four branch signals and receiving a first logic input, for adjusting a phase of a first optical output in response to the first logic input;

a second SOA, receiving a second branch signal of the four branch signals, for generating a second optical output that matches a phase of the first optical output when the first SOA does not adjust the phase of the first optical output;

a third SOA, receiving a third branch signal of the four branch signals and receiving a second logic input, for adjusting a phase of a third optical output in response to the second logic input;

a fourth SOA, receiving a fourth branch signal of the four branch signals, for generating a fourth optical output that matches a phase of the third optical output when the third SOA does not adjust the phase of the third optical output;

a combiner, receiving the first, second, third, and fourth optical outputs, for generating a combined output; and a power-restoring SOA, coupled to receive the combined output from the combiner, for generating a final output having about the high power level when the first logic input is not at the high power level and the second logic input is not at the high power level, but for generating the output with a low power level when either or both of the first and second logic inputs are at the high power level, whereby the high power level is restored.

23. The optical NAND gate of claim 22 wherein the combiner comprises:

an upper junction, receiving the first and second optical outputs, for generating an upper output;

a lower junction, receiving the third and fourth optical outputs, for generating a lower output;

a MMI device, receiving the upper and lower outputs, for generating the combined output.

* * * * *